Oct. 31, 1967
J. D. BARNEY ET AL
3,350,618
BATTERY CHARGING CONTROL
Filed April 1, 1964
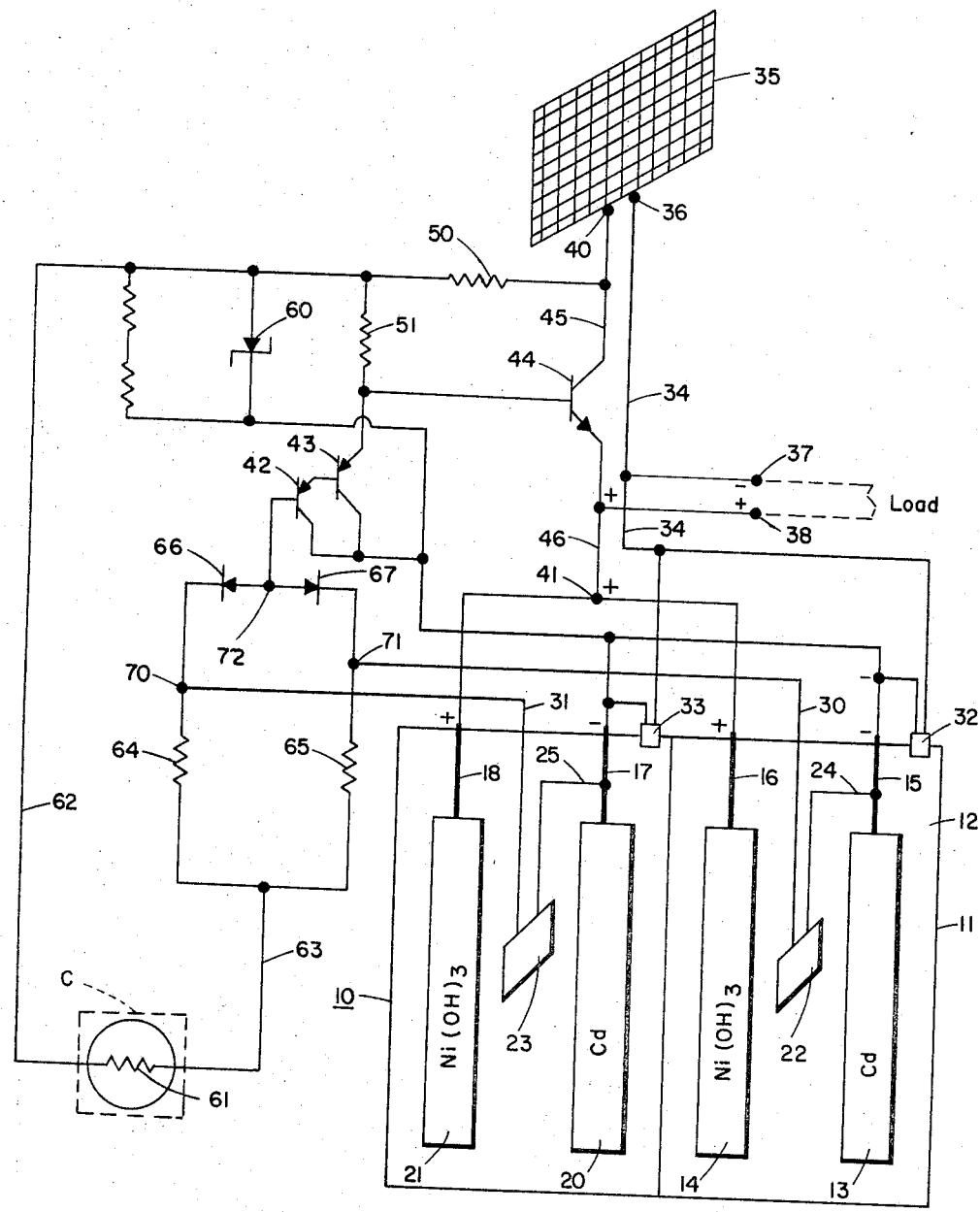
INVENTOR.
JOHN D. BARNEY
LELAND A. ZANTESON
BY John E. Wagner
ATTORNEY United States Patent Office 3,350,618
Patented Oct. 31, 1967

3,350,618
BATTERY CHARGING CONTROL
John D. Barney, Altadena, and Leland A. Zanteson, Pasadena, Calif., assignors to Space-General Corporation, El Monte, Calif., a corporation of California
Filed Apr. 1, 1964, Ser. No. 356,503
3 Claims. (Cl. 320—5)

This invention relates to battery charging control and more particularly to systems for automatically controlling the rate and extent of charge of a storage cell within the maximum allowable limits.

Heretofore the control of charge rate for storage cells has been accomplished in a number of different ways. The most common and normally effective method of charge control is the so-called trickle charge method in which the maximum allowable charge rate is determined in advance for the particular type of storage cell, e.g. a five-hour charge rate for nickel cadmium batteries, and the charger set to recharge the cell at a small percentage of that maximum allowable rate, e.g. a twenty-hour recharge rate. This latter rate may be sufficiently low that the battery may be continuously overcharged at that rate without damage or in the alternative may be used to terminate the charge cycle. This type of charge control is, of course, effective and in situations where the efficiency or speed of charge cycle are of little consequence is eminently satisfactory.

Another type of charging system is one which charges the cell at a higher rate than in the trickle charge method, meanwhile monitoring the terminal voltage of the cell, which in the case of lead-acid batteries varies slightly with the condition of charge. The charging cycle is terminated when the nominal full charge terminal voltage is reached. This method of battery charge allows higher rates to be used and, as in the case of lead-acid batteries, is reasonably effective in preventing harmful overcharge. It is limited in application to such improved batteries as the nickel-cadmium type which have very little, if any, change in terminal voltage as a function of the level of charge during the recharging cycle.

It has been common in other types of charge systems to sense the ambient temperature and to vary the charge current applied to the battery inversely as a function of the ambient. This system allows a higher charge current to pass through the cell when the ambient temperature is low and consequently the electrolyte temperature is lower and the series resistance through the electrolyte is higher. Whenever there is an increase in ambient temperature there results a reduction in cell internal resistance and the current is limited externally. Where it is the objective to charge a cell such as a nickel-cadmium battery at the maximum allowable rate and still effectively prevent harmful overcharge, none of the aforementioned types of charge controls are effective. This is particularly true if the charge source is one such as a solar panel subject to cyclical radiation from the sun and producing an ouput current which may vary from zero during the night to a maximum level of several amperes during the height of solar radiation. In spacecraft applications where the advantages of solar cells as a primary electrical source, and nickel-cadmium batteries as a secondary energy source, constitute the most practical electrical energy sources of the vehicle, the system of control of recharge of the nickel-cadmium battery cells from the solar cell array is of critical importance. The same relationship holds true on terrestrial applications where no manual or programmed control of the charging cycle is desired.

With this understanding of the state of the art it is a prime objective of this invention to improve battery charging control.

More specifically it is an object of this invention to provide a relatively simple system for providing high-speed efficient charging of nickel-cadmium batteries.

Another object of this invention is to provide an efficient charging system which is subject to extreme cycling of charging source power output and extreme ambient temperature changes as well.

These objects are all achieved in accordance with this invention, one embodiment of which comprises a solar cell panel constituting the principal power source for a load and, additionally, the recharger for a secondary cell. Connected between the solar panel and the secondary cell is a transistor series-regulator with a control circuit for limiting the current passed by the regulator to the secondary storage cells. The control circuit includes a pair of thermally sensitive resistance elements or thermistors, one of which is positioned to respond to ambient temperature and the other of which reflects the secondary cell electrolyte temperature. The current flow through the two thermally responsive elements is combined such that the current passed by the regulator from the solar panel to the battery cell is a function of the differential temperature sensed by the thermally responsive resistance elements.

A feature of this invention resides in the combination of a solar cell panel as the principal power source, a rechargeable storage cell as a secondary source, both continuously connected to a load, and a regulator for controlling the recharge of the storage cell from the solar panel without harmful overcharge.

One feature of this invention resides in the recognition that the control of charge of a nickel-cadmium battery may be achieved by the monitoring of electrolyte temperature to limit the charging current flow responsive to temperature increases which indicate overcharge.

Another feature of this invention resides in the combination of a pair of thermally sensitive elements and means for controlling the flow of charging current to the battery as a function of the differential temperature as detected by the thermally sensitive elements.

One further feature of the invention resides in the combination of a charging current source, a solid state series-regulator, and thermally sensitive elements controlling the conduction characteristics of the series-regulator.

These and other features of this invention may be more clearly understood by the following detailed description and by reference to the drawing comprising an electrical schematic representation of a solar cell, primary cell and charging source, secondary storage cell, and a charge regulating system of this invention.

Now referring to the figure, the system disclosed therein is designed as the electrical energy source of a space vehicle, for example an Earth satellite, designed to make certain observations through the use of a number of sensors and to transmit information to the Earth. Because of the application, the photovoltaic or solar cells constitute the most practical source of electrical energy. Also certain of the characteristics of the nickel-cadmium battery as opposed to other types of storage cells, make it most attractive as a secondary power source for use when solar energy is absent. Of particular significance is the ability of the nickel-cadmium battery to be repeatedly discharged without damage and to be recharged at a relatively rapid rate thereafter, providing, however, that the overcharge rate is low.

In the drawing a pair of banks of series-connected nickel-cadmium storage cells 10 is represented in simlified form as a two-cell assembly including a housing 11 having a first sealed compartment 12 containing as the electrolyte a solution of potassium hydroxide and further containing a cathode 13 of sintered cadmium and a nickel hydroxide anode 14. The electrodes are externally connected through respective terminals 15 and 16. The second cell contains a similar cathode 20 of cadmium, and anode 21 of nickel hydroxide, with respective terminals 17 and 18. Each of the cells contain, additionally, indivdual thermally responsive or thermistor elements 22 and 23, each having one lead 24 and 25 connected to a respective cathode 13 or 20, and the second lead 30 or 31 respectively extending out of the battery housing 11 to the control circuit hereafter described. For convenience the thermistors 22 and 23 are shown as rectangular plates positioned between the electrodes of the cell. The shape and position of the thermistors 22 and 23 are not of significance and they may be located any place as long as they remain in thermal contact with the battery and more specifically with the cadmium electrode. This may be readily accomplished by submersion of the thermistors 22 and 23 in the electrolyte. Each storage cell also includes a pressure switch 32 or 33 extending into the housing and normally closed but responding to over-pressure in the individual cell to open the electrical connection between the respective cathode terminals 15 and 17 and negative lead 34 connected to the principal power or charging energy source, in this case a solar panel 35, and negative load terminal 37. The common positive terminal 41 of the secondary cell 10 is connected via a lead 46 to the positive load terminal 38.

Connected between the positive terminal 40 of the solar panel 35 and the common external positive terminal 41 of the nickel-cadmium battery 10 is the battery charge control circuit of this invention. It comprises a three-stage transistor control circuit including two PNP transistors 42 and 43 and one NPN transistor 44 connected with the collector electrode of the transistor 44 connected to the terminal 40 of the solar panel through lead 45, and the emitter connected to the common battery terminal 41 via lead 46. Base bias of the transistor 44 is provided via a pair of resistors 50 and 51 with the base signal input to transistor 44 from the emitter of transistor 43. The emitter-collector voltage of the intermediate transistor 43 is regulated by a Zener diode 60 connected between the common point of the resistors 50 and 51 and the common collector connection of transistors 42 and 43. The Zener diode 60 provides a constant voltage across the emitter-collector of transistor 43 and similarly a regulated voltage across the emitter-collector of transistor 42 equal to the same voltage across transistor 43, except for the emitter-base voltage drop $V_{eb}$ of transistor 43.

Control of the series-regulator is effected by variations in D.C. level of the base of transistor 42 which is under the control of the thermally sensitive elements 22 and 23 contained within the battery 10, and an additional thermally sensitive element 61 located outside of the cells in a position to reflect the ambient temperature of the equipment or vehicle. This thermally sensitive element or thermistor 61 is normally surrounded with an insulating cover C, indicated in the drawing by the dashed line, which serves to provide a thermal lag in response corresponding to the thermal lag encountered by the thermally sensitive elements 22 and 23 within the cell 10. For purposes of comprehension of this invention, the insulating cover C should be ignored and the thermally sensitive element 61 should be considered as fully exposed to ambient temperature changes. One terminal of the element 61 is connected via lead 62 to the anode of the Zener diode 60 and effectively connected to the solar panel terminal 40 while the second terminal of element 61 is connected via lead 63 to the junction of a pair of parallel branches, each including a resistance 64 or 65 respectively and an oppositely poled diode 66 and 67. Between the resistor 64 and diode 66 is a junction 70 to which the lead 31 from the thermally sensitive element 23 is connected, and similarly the lead 30 from thermally sensitive element 22 is connected to a terminal 71 intermediate the resistor 65 and diode 67. The multiple branch circuit is employed to provide inputs from the thermally sensitive element of each of the two storage cells. Where additional cells are present additional branches similarly connected are employed. The anodes of diodes 66 and 67 are connected to a common junction 72 which in turn constitutes the base input to the transistor 42.

The operation of the charge control system of this invention may best be understood with first having a comprehension of the normal charge and discharge cycle of the nickel-cadmium battery. As indicated above, the nickel-hydrate anode and cadmium cathode are immersed in a solution of potassium hydroxide. The charge and discharge cycle is reversible as indicated by the chemical reaction:

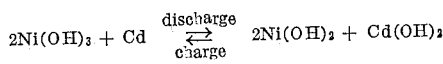

The electrolyte does not enter into the action but acts merely as a carrier for the hydroxyl $(OH)^-$ ions from the nickel hydroxide anode to the cadmium cathode. The electro-chemical reaction in the presence of an external charging circuit or an external load under normal charge or discharge conditions is represented by the following equation:

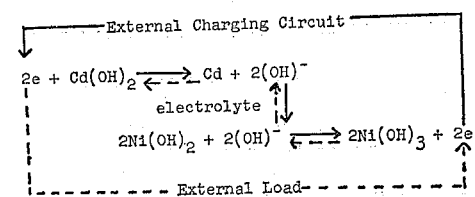

Hermetically sealed cells of the type suitable for space operations are designed to have an excess of cadmium hydroxide so that during charge the positive electrode reaches full charge, i.e. becomes fully hydrated, before the cathode. Continued application of charging current tends to electrolyze the water content of the electrolyte and oxygen is liberated at the anode. Hydrogen liberated at the cathode at the same time combines with the cadmium hydroxide to replenish the water in the cell as follows:

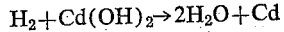

If oxygen from the anode has access to the cathode, it will recombine to form cadmium hydroxide in the following action:

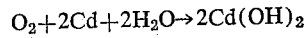

After a cell has been fully charged, it can be continuously overcharged without damage at the rate at which the oxygen recombination action can take place. There are two limitations upon this rate in practical application and they are:

(1) The internal pressure which the cell can withstand; and (2) The amount of heat which is generated during overcharge and the thermal dissipation capability of the battery.

The pressure switches 32 and 33 are designed to interrupt charging current and prevent any damage to the cell due to overpressure. The regulator of this invention is operative to prevent any damage to the cell due to overheating and in fact senses the condition and charge rate of the cell by monitoring the heat of overcharge. The overcharge cycle reaction is set forth below:

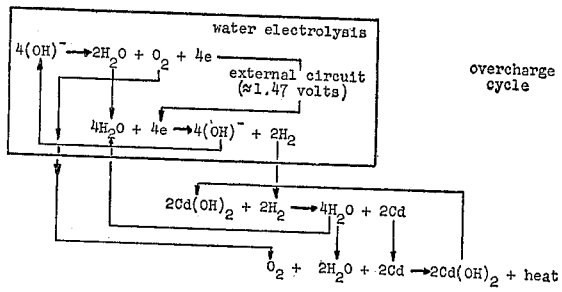

The end products of overcharge are the free oxygen, water, cadmium, and cadmium hydroxide, plus liberated heat. The thermally sensitive elements 22 and 23 in the individual cells sense the heat generated on overcharge and with increase in internally generated heat tend to reduce the resistance between the cathodes 13 and 20 of the respective cells (connected to the collectors of transistors 42 and 43) and the junctions 72 or 71 in the base circuit of transistor 42.

At the same time the thermally sensitive elements 22 and 23 sense the electrolyte temperature, the element 61 responds to ambient temperature, and by their combined effect control the potential of the junction 72. In all conditions other than overcharge ambient, temperature changes tend to affect both the external element 61 and the internal elements 22 and 23 similarly, so that any change of potential at junction 72, due to a change in resistance of element 61, is compensated by an equal and opposite change in the response of the branches containing the elements 22 and 23. In effect element 61 is in a series branch and each element 22 and 23 is in a parallel branch supplying the common control point 72 at the base of transistor 42. The diodes 66 and 67 isolate the individual thermistors 22 and 23 and whichever cell shows the greater differential temperature, compared with the ambient, controls the charge rate.

In a typical case where the ambient temperature remains constant and the temperature in one or the other of the cells increases due to overcharge, the resistance of its associated branch falls owing to the negative temperature characteristics of the thermistors 22 and 23, and the respective diode 66 or 67 conducts thereby increasing the current flow through the base of transistor 42. Increased current flow through transistor 42 similarly increases the conduction at PNP transistor 43 tending to cut off NPN transistor 44, reducing the charging current from the solar panel to the cell 10. As long as the over-temperature exists in the cells, the current to the cells from the solar panel is limited until an equilibrium with the ambient temperature again exists. At that time maximum charging will again resume.

In the case where the vehicle carrying the power supply emerges from the solar night and into very increasing radiant energy from the sun, the control circuitry will normally be in condition to apply maximum charging current to the secondary cells, i.e. that is with the temperature effects of both the internal thermally resistive elements 22 and 23 balanced by the effect of element 61 and transistor 44 fully conducting. As the ambient temperature increases, both the response of the element 61 and the elements 22 and 23 will increase together at a rate determined by the physical configuration and placement of the battery and the thermal insulation C of the element 61. As these elements increase in temperature and decrease in resistance together, the charging rate will continue at a maximum regardless of the ambient temperature. Similarly, as the vehicle passes the solar noon and the ambient temperature begins to fall, charging will continue at the maximum rate unless the cells become overcharged to such extent that a differential temperature, with respect to the ambient, is produced due to generation of internal heat and the charging rate decreased.

This invention is particularly suited for the charging control of nickel-cadmium batteries charged by solar cells, but the concept is directly applicable to any cell exhibiting a temperature increase upon overcharge. The allowable depth of discharge, terminal voltage and maximum discharge, and charge rate, all may vary with the type of cell used and with the ambient temperature and consequently the specific parameters of the charge control current will vary. In one specific application the system of this invention was used to provide optimum charging of banks of 7 series-connected, 1.2 ampere-hr. capacity Model S104 nickel-cadmium cells of the Sonotone Corporation of Elmsford, N.Y. The charging source panel 35 comprised silicon photo-voltaic cells, Hoffman Electronics Model 220GG (capacity 350 ma. @ 450 mv.).

The embodiments of this invention described above are only illustrative of the principles of this invention and it is fully recognized that one skilled in the art, following my teaching, can devise other variants without departing from the spirit of my invention. The grant hereof therefore is not limited to the embodiments illustrated, but rather by the scope of the following claims and the equivalents thereof.

What is claimed is:

1. A power supply system comprising a solar cell having a pair of terminals for connection to an electrical load, a storage cell connected in parallel with the solar cell, whereby load current is supplied by a combination of the solar cell and storage cell, and whereby the solar cell when subject to ambient radiation serves to maintain the charge of the storage cell;

a current regulator connected in the current path between the solar cell and the storage cell, said current regulator including a transistor with emitter and collector electrodes in the series current path from the solar cell, and a voltage reference source for maintaining a predetermined maximum electrode bias on said transistor, and a pair of temperature sensitive resistance elements, one of said pair of resistance elements positioned to be responsive to ambient temperature and one positioned to be responsive to the temperature of the electrolyte in the storage cell, means connecting said pair of temperature sensitive resistance elements to vary the base bias on the transistor and thereby the passage of the transistor current from the solar cell to the storage cell.

2. The combination in accordance with claim 1 wherein the voltage reference source for maintaining a predetermined maximum bias on the transistor comprises a Zener diode which is in parallel with the base bias circuit of the transistor.

3. A combination in accordance with claim 2, wherein the storage cell temperature responsive resistance element and the ambient temperature responsive resistance element are connected in series between one terminal of the solar cell and a terminal of the storage cell, and the common junction of the two temperature reference resistance elements is connected to control the base bias circuit of the transistor.

References Cited
UNITED STATES PATENTS

| 2,967,988 | 1/1961 | Seright | 320—36 |
| 3,100,862 | 8/1963 | Collier | 320—46 |
| 3,102,222 | 8/1963 | Harmer | 320—36 |
| 3,222,535 | 12/1965 | Englehardt | 320—22 X |
| 3,226,623 | 12/1965 | Krueger et al. | 320—24 X |

JOHN F. COUCH, *Primary Examiner.*

S. WEINBERG, *Assistant Examiner.*